United States Patent [19]
Phillips et al.

[11] Patent Number: 5,873,023
[45] Date of Patent: Feb. 16, 1999

[54] METHOD AND APPARATUS IN A MESSAGING SYSTEM FOR IMPLEMENTING A GROUP CALL

[75] Inventors: W Garland Phillips, Arlington; Eric Jon Robert Wesley, Fort Worth; Alain Charles Briancon, McKinney; Jeffrey David Couts, Fort Worth, all of Tex.

[73] Assignee: Motorola, Inc., Schaumburg, Ill.

[21] Appl. No.: 752,367

[22] Filed: Nov. 19, 1996

[51] Int. Cl.$^6$ ........................................ H04Q 7/00
[52] U.S. Cl. ................ 455/38.1; 455/519; 455/458; 340/825.44
[58] Field of Search .................. 455/38.1, 31.3, 455/426, 458, 518, 519; 370/389, 390; 340/825.44, 311.1, 825.52

[56] References Cited

U.S. PATENT DOCUMENTS

| | | | |
|---|---|---|---|
| 4,110,743 | 8/1978 | Zahnd | 340/825.47 |
| 4,716,410 | 12/1987 | Nozaki | 340/825.52 |
| 4,760,572 | 7/1988 | Tomikawa | 340/825.52 |
| 5,315,635 | 5/1994 | Kane et al. | 340/825.44 |
| 5,371,899 | 12/1994 | Kuznichi et al. | 455/38.1 |
| 5,396,537 | 3/1995 | Schwendeman | 455/31.3 |
| 5,463,382 | 10/1995 | Nikas et al. | 455/38.1 |
| 5,635,914 | 6/1997 | Petreye et al. | 340/825.44 |
| 5,748,100 | 5/1998 | Gutman et al. | 340/825.44 |

OTHER PUBLICATIONS

Motorola, Inc., "FLEX™ Protocol Specification and FLEX™ Encoding and Decoding Requirements," p. 59, Apr. 12, 1996, U.S.A.

*Primary Examiner*—Willis R. Wolfe
*Assistant Examiner*—Hieu T. Vo
*Attorney, Agent, or Firm*—R. Louis Breeden

[57] ABSTRACT

A messaging system implements a group call in a controller (110, 120) by receiving (306) first and second messages intended for first and second recipients and determining (416) that the first and second messages are identical to one another. In response to making that determination, the controller transmits (522) the first and second messages as a single group call message.

21 Claims, 5 Drawing Sheets

1

METHOD AND APPARATUS IN A MESSAGING SYSTEM FOR IMPLEMENTING A GROUP CALL

FIELD OF THE INVENTION

This invention relates in general to messaging systems, and more specifically to a method and apparatus in a messaging system for implementing a group call.

BACKGROUND OF THE INVENTION

With the growing use of email and personal computer software applications to interface to messaging systems, messages are being sent to ad hoc groups at an increasing rate. Message originators commonly use email to send a message to a group of recipients informing them of upcoming meetings, breaking news, lunch plans, and the like. The airtime required for long messages sent to multiple recipients is large, and messaging service providers are anxious to find a way to combine such messages into a single transmission whenever possible.

Some messaging protocols provide a mechanism to allow an unlimited number of recipients to receive the same message. Motorola's FLEX™ protocol, for example, can use individual addresses to send each recipient an instruction to listen at a future time and to use a temporary address shared by all the recipients. This is referred to as a dynamic group call. Unfortunately, current network interface protocols do not provide a mechanism for instructing messaging system controllers to form dynamic group call messages. Nor do current controllers have the ability to implement dynamic group call messages on their own initiative.

Thus, what is needed is a method and apparatus that will allow the implementation of dynamic group call messages in messaging systems. The method and apparatus preferably should perform automatically to detect messages that can be combined, and to combine such messages by transmitting them as a dynamic group call message when doing so will save airtime.

SUMMARY OF THE INVENTION

An aspect of the present invention is a method in a messaging system for implementing a group call. The method comprises in a controller the steps of receiving first and second messages intended for first and second recipients, and determining that the first and second messages are identical to one another. The method further comprises the step of transmitting the first and second messages as a single group call message, in response to determining that the first and second messages are identical to one another.

Another aspect of the present invention is a controller in a messaging system for implementing a group call. The controller comprises a communication interface for receiving first and second messages intended for first and second recipients, and a processing system coupled to the communication interface for determining that the first and second messages are identical to one another. The controller further comprises a transmitter interface for transmitting the first and second messages as a single group call message, in response to determining that the first and second messages are identical to one another.

DETAILED DESCRIPTION OF THE DRAWINGS

Figure 1:
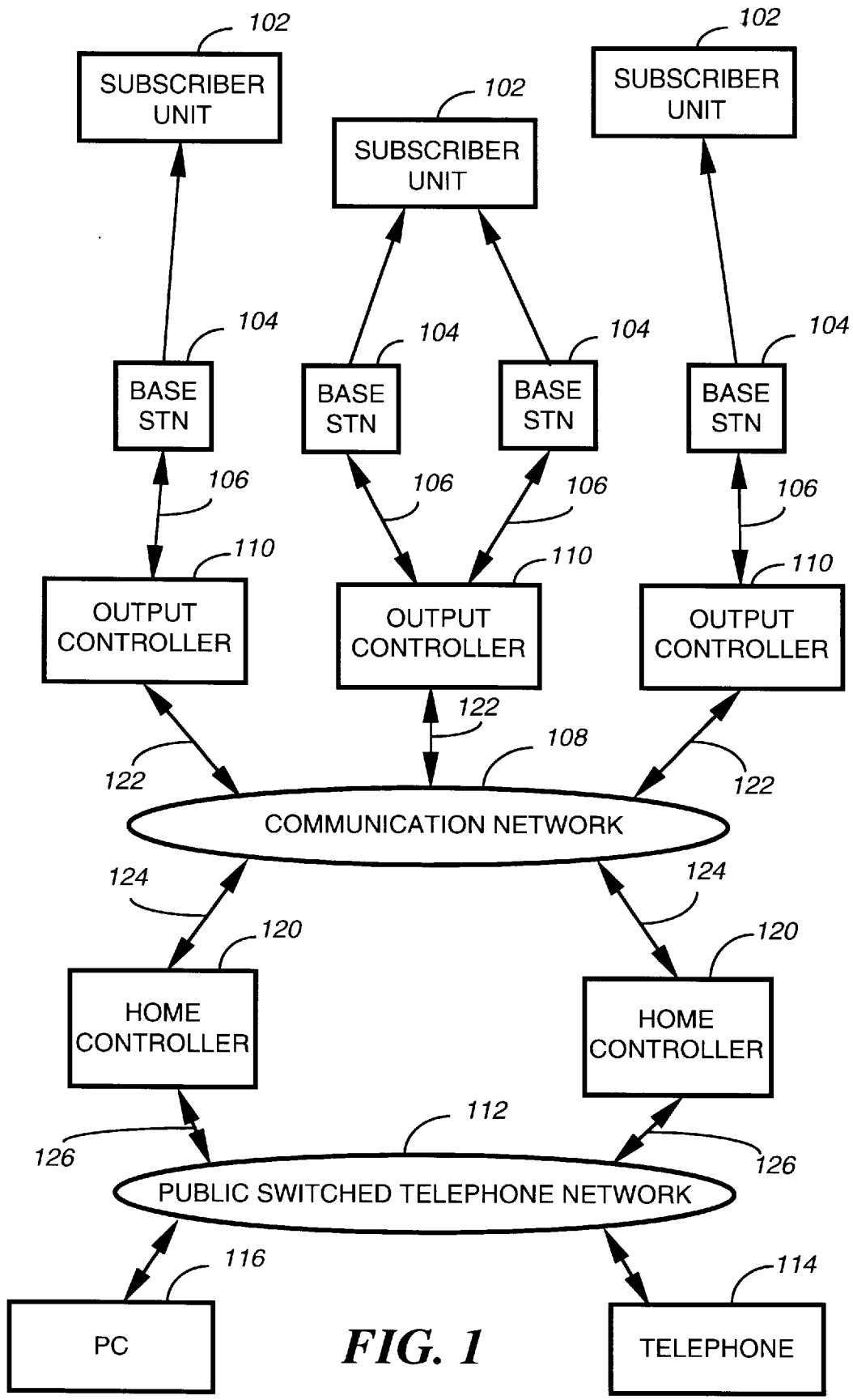
FIG. 1 is an electrical block diagram of a messaging system in accordance with the present invention.

Referring to FIG. 1, an electrical block diagram of a messaging system in accordance with the present invention comprises a plurality of subscriber units 102, which communicate by radio with a plurality of base stations 104 for receiving selective call messages. The base stations 104 are coupled via communication links 106 to a plurality of output controllers 110 for control thereby utilizing well-known techniques for base station control. The output controllers 110 are coupled to a plurality of home controllers 120 via communication links 122, 124, and via a conventional communication network 108 for receiving the selective call messages from the home controllers 120. The home controllers 120 and the output controllers 110 preferably communicate by utilizing a well-known protocol, e.g., the Telocator Network Paging Protocol (TNPP) or the InterPaging Networking Protocol (IPNP). The home controllers 120 are preferably coupled via telephone links 126 to a public switched telephone network 112 (PSTN) for receiving the messages from message originators utilizing, for example, a telephone 114 or a personal computer 116 to originate the messages. It will be appreciated that, alternatively, other types of communication networks, e.g., packet switched networks, local area networks, and the Internet can be utilized as well for transporting originated messages to the home controllers 120. The hardware of the home controllers 120 is preferably similar to the Wireless Messaging Gateway (WMG™) Administrator! paging terminal, while the hardware of the output controllers 110 is preferably similar to that of the RF-Conductor!™ message distributor, both manufactured by Motorola, Inc. of Schaumburg, Ill. The base stations 104 are preferably similar to the Nucleus® Orchestra! transmitter manufactured by Motorola, Inc. It will be appreciated that other similar hardware can be utilized as well for the home controllers 120, the output controllers 110, and the base stations 104. By way of example, the messaging system depicted in FIG. 1 is a one-way messaging system. It will be appreciated that the present invention can be applied to a two-way messaging system as well.

The protocol utilized for transmitting the messages between the base stations 104 and the subscriber units 102 is preferably similar to Motorola's well-known FLEX™ family of digital selective call signaling protocols. These protocols utilize well-known error detection and error correction techniques and are therefore tolerant to bit errors occurring during transmission, provided that the bit errors are not too numerous in any one code word. It will be appreciated that other similar messaging protocols can be used as well.

Figure 2:
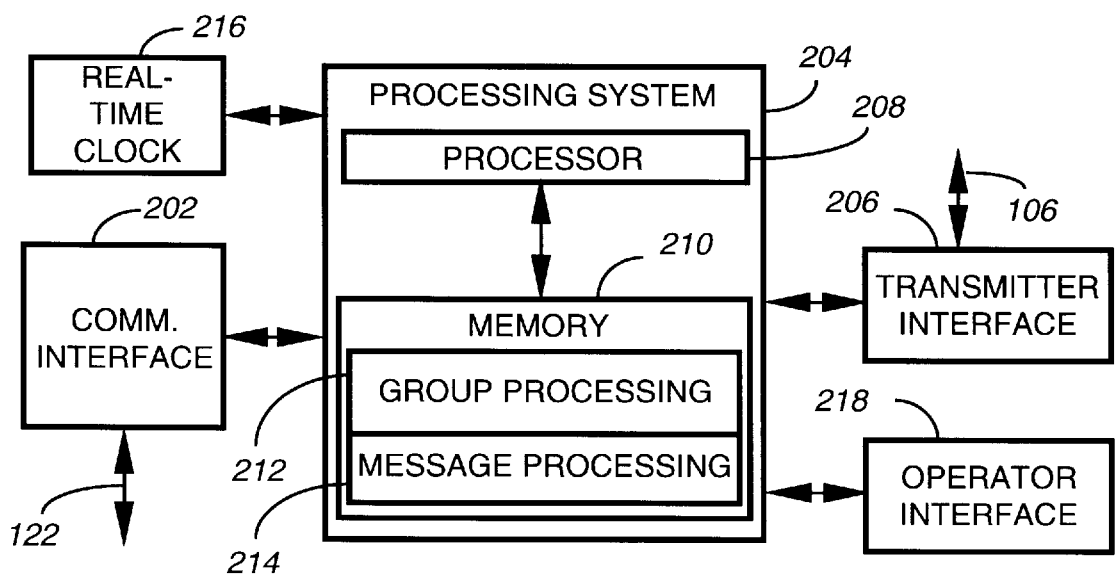
FIG. 2 is an electrical block diagram of a controller in accordance with the present invention.

Referring to FIG. 2, an electrical block diagram of the output controller 110 in accordance with the present invention comprises a conventional communication interface 202 for communicating with the home controllers 120 via the communication link 122. The output controller 110 also includes a processing system 204 coupled to the communication interface 202 for processing communications transmitted and received through the communication interface 202. A conventional transmitter interface 206 is also coupled to the processing system 204 for cooperating with the processing system 204 to control and communicate with the base stations 104. A conventional real-time clock 216 is coupled to the processing system 204 for providing thereto a time signal. The processing system 204 comprises a processor 208 for executing the operations of the processing system 204, and a memory 210 for storing executable software elements for programming the processor 208. The memory 210 comprises a message processing element 214 for programming the processing system 204 to process the messages handled by the output controller 110. The memory 210 further comprises a group processing element 212 for programming the processing system 204 to form and transmit group call messages in accordance with the present invention. An operator interface 218 also is coupled to the processing system 204 for allowing an operator of the messaging system to interface with selection control software in the group processing element 212.

The group processing element 212 preferably programs the processing system 204 to determine that the output controller has received first and second messages that are identical to one another, and to wait for a predetermined time after determining that the first and second messages are identical to one another to detect whether additional messages identical to the first and second messages are received, and to combine such additional messages into a single group call message. The group processing element 212 also programs the processing system 204 to form the single group call message in accordance with a messaging protocol which includes a dynamic group address mode capability, e.g., the FLEX™ protocol. The group processing element 212 further programs the processing system 204 to provide selection controls for allowing an operator of the messaging system to specify criteria to be met before a message is considered for transmission as a group call message, and to skip transmitting the first and second messages as a single group call message, in response to at least one of the first and second messages failing to meet the criteria specified. In addition, the group processing element 212 programs the processing system 204 to send an acknowledgment to the home controller 120 of each message recipient, the acknowledgment indicating that the recipient's message was transmitted in a single group call message, in response to transmitting the first and second messages as a single group call message.

The group processing element 212 further programs the processing system 204 to calculate, in response to determining that the first and second messages are identical to one another, a first transmission capacity required to transmit the first and second messages as individual messages and a second transmission capacity required to transmit the first and second messages as the single group call message; and to skip transmitting the first and second messages as a single group call message, and instead transmit the first and second messages as individual messages, in response to the second transmission capacity being greater than the first transmission capacity. In addition, the group processing element 212 programs the processing system 204 to calculate first and second hash indexes from attributes of the first and second messages, to compare the first and second hash indexes, and to define the first and second messages to be group call candidates in response to the first and second hash indexes being equal to one another. The group processing element 212 also programs the processing system 204 to compare predetermined portions of the first and second messages, in response to the first and second messages being defined to be group call candidates.

The group processing element 212 further programs the processing system 204 to store in the memory 210 at a location defined by a hash index a count of pending messages corresponding to the hash index, and to store in the memory 210 each pending message and corresponding hash index. In addition, the group processing element 212 programs the processing system 204 to receive an interswitch command for triggering a dynamic group call, and to send the dynamic group call in response to the interswitch command. It will be appreciated that software similar to the group processing element 212 can be placed in the home controller 120 for forming dynamic group calls therein as well.

Figure 3:
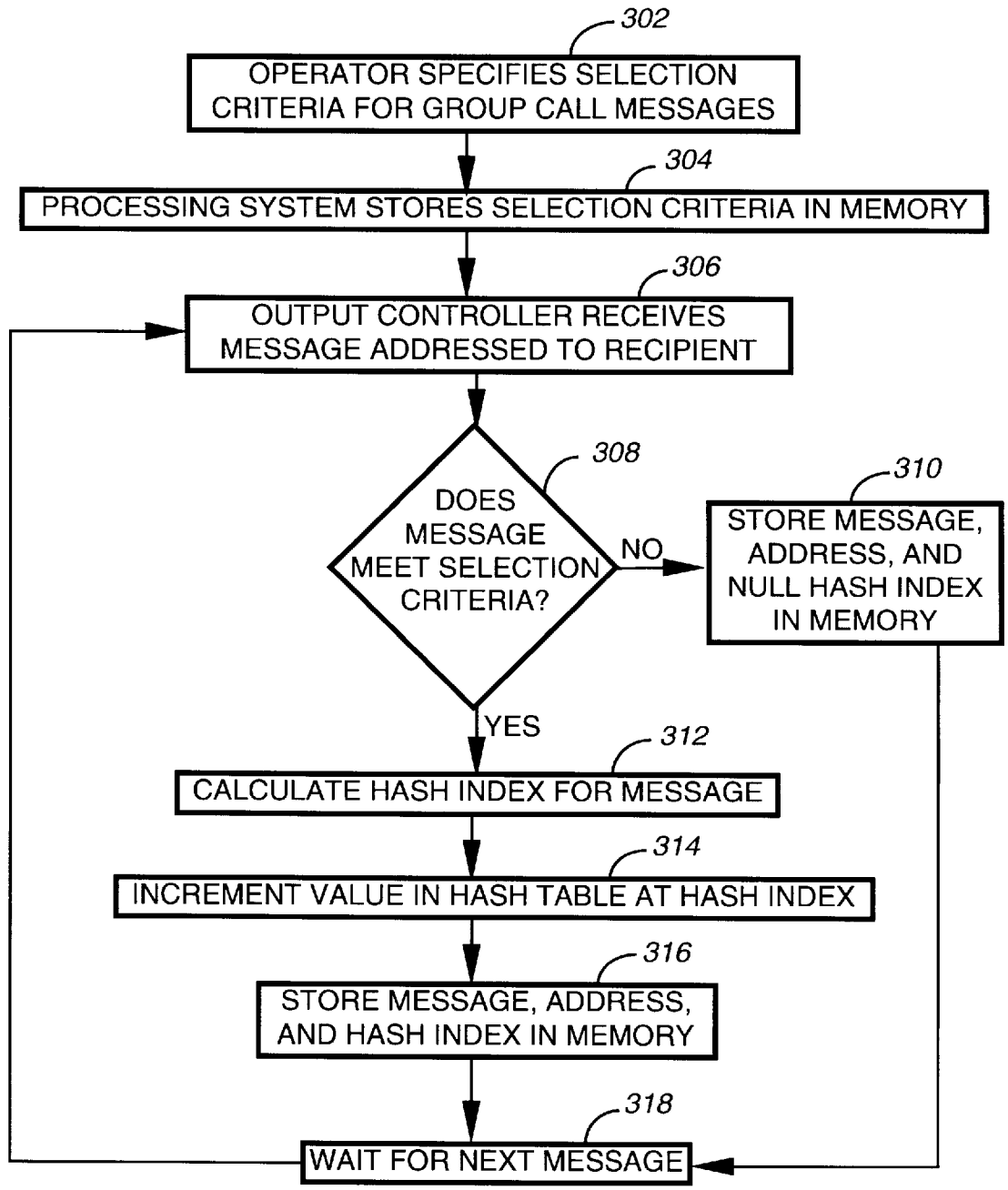
FIGS. 3–5 are flow charts depicting operation of the controller in accordance with the present invention.

Referring to FIG. 3, a flow chart 300 depicts operation of the output controller 110 in accordance with the present invention. The flow chart 300 begins with an operator of the message system accessing the operator interface 218 to specify 302 selection criteria for forming group call messages. For example, the operator can select from numeric, alpha, and binary message types. The operator can choose a minimum length message with each type. The output controller 110 then will attempt to form a group message only when it encounters a message of the type and minimum length specified by the operator. The operator may choose to disallow priority messages from being included in a group call, as grouping will normally increase the latency of a page.

The processing system 204 then stores 304 the selection criteria in the memory 210. Sometime later, the communication interface 202 of the output controller 110 receives 306 a message addressed to a recipient. In response, the processing system 204 checks 308 whether the message meets the selection criteria for forming group call messages. If not, the processing system 204 stores 310 the message, address, and a null hash index in the memory 210. The null hash index preferably is a predetermined hash index outside the range of the hash table of the memory 210, which the system stores to indicate that no hash table entry was made for the message. The processing system 204 then waits 318 for a next message to be received.

If, on the other hand, at step 308 the processing system 204 determines that the message meets the selection criteria for forming group call messages, then the processing system calculates 312 a hash index for the message and then increments 314 a value in the hash table, the value located by the hash index.

A hash table is basically an array. In accordance with this embodiment of the present invention, its size is Y and it contains integers. A mathematical function is performed on several message attributes, e.g., the message content, the transmission channel, the transmission zone, the system identifier, the message type, and the message length. The result is an integer X. A modulo function is performed using the integer X and the size of the hash array Y. X modulo Y yields a remainder Z which is used as an index into the hash table. This is known as the "division method" of hashing. The value stored in the array at index Z is then incremented by one. Zero is initially stored there.

The mathematical function is referred to as the hash key calculation algorithm. It is preferred to find a hash algorithm which will tend to disperse all data uniformly throughout the hash table. If the algorithm is good, then nearly every message calculation yields a different Z unless the attributes used in the calculation are identical. When they are identical, then we get the same hash key and thus the same location in the hash table, as desired.

An example algorithm is this: hash key=[(sum of message characters)+(channel number)+(zone number)+(system number)+(message type)+(message length)] modulo (table size). The sum of message characters is the sum of characters taking each digit as an integer. The channel number is a numeric representation of the radio frequency channel. The zone number is a numeric representation of the transmission zone. The system number is the numeric representation of the paging system identifier. The message type is a numeric representation of "alpha", "numeric", or "binary". The table size is the size of the hash table and is preferably a large prime number, e.g., 2003.

Figure 4:
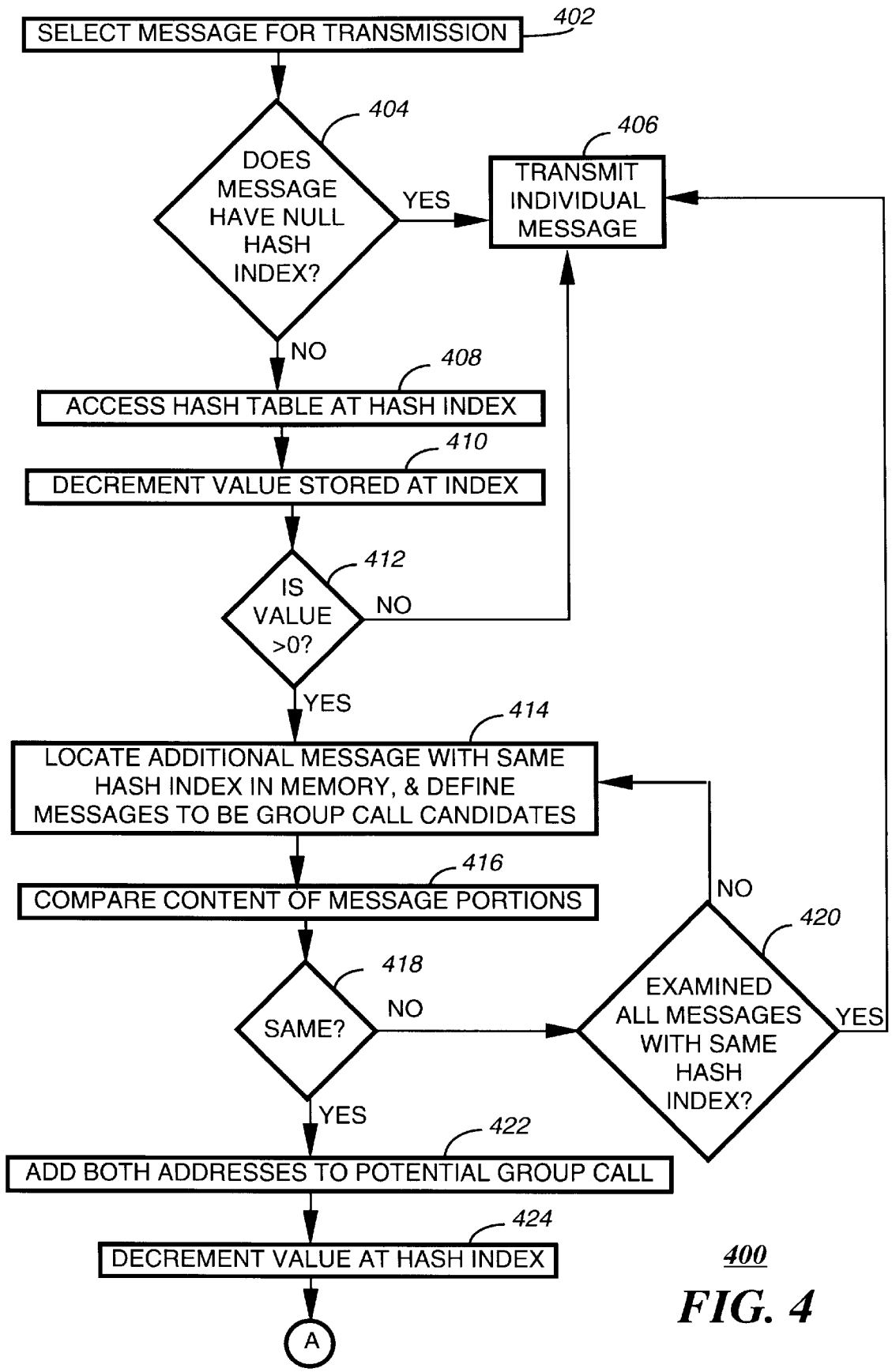

After incrementing the value in the hash table, the processing system stores 316 the message and the corresponding hash index in the memory 210. The message structure contains fields specifying various attributes of the message, e.g., recipient's address, message type, message priority, and message length. The processing system then waits 318 for a next message. Referring to FIG. 4, a flow chart 400 depicting operation of the output controller 110 in accordance with the present invention starts with the processing system 204 selecting 402 a queued message for transmission. Then the processing system 204 checks 404 whether the message has a null hash index stored therewith. If so, the message did not meet the selection criteria for a group call, so the processing system 204 simply transmits 406 the message as an individual message. If, on the other hand, the message does not have a null hash index, then the processing system 204 accesses 408 the hash table in the memory 210 at the location defined by the hash index. The processing system 204 then decrements 410 the value stored in the hash table at the indexed location. The processing system 204 then checks 412 whether the decremented value is still greater than zero. If not, there are no other similar messages that are group call candidates, so the processing system transmits 406 the message individually.

If, on the other hand, the decremented value is greater than zero, the processing system 204 searches the memory 210 to locate 414 another message with the same hash index, and when such a message is found the processing system 204 defines the two messages to be group call candidates. The processing system 204 then compares 416 the content of predetermined portions of the messages. For example, the processing system compares the informational content, the RF channel, the zone, the system ID, and the page type of the messages to insure that all are identical. If at step 418 all are the same, the processing system 204 adds 422 both addresses to a potential group call message comprising the informational content and to be sent on the RF channel and zone. The processing system then decrements 424 the value at the hash index to account for the planned transmission of the second message. The flow then proceeds to step 502 of the flow chart 500 (FIG. 5).

If, on the other hand, at step 418 the content of the predetermined portions of the messages are not all the same, then the processing system 204 checks 420 whether all messages with the same hash index have been examined for matching the message selected in step 402. If all have been examined, the processing system 204 proceeds to step 406 and transmits the message individually, as no other messages were found to be identical. If all have not been examined, the processing system 204 returns to step 414 to locate another message with the same hash index.

Figure 5:
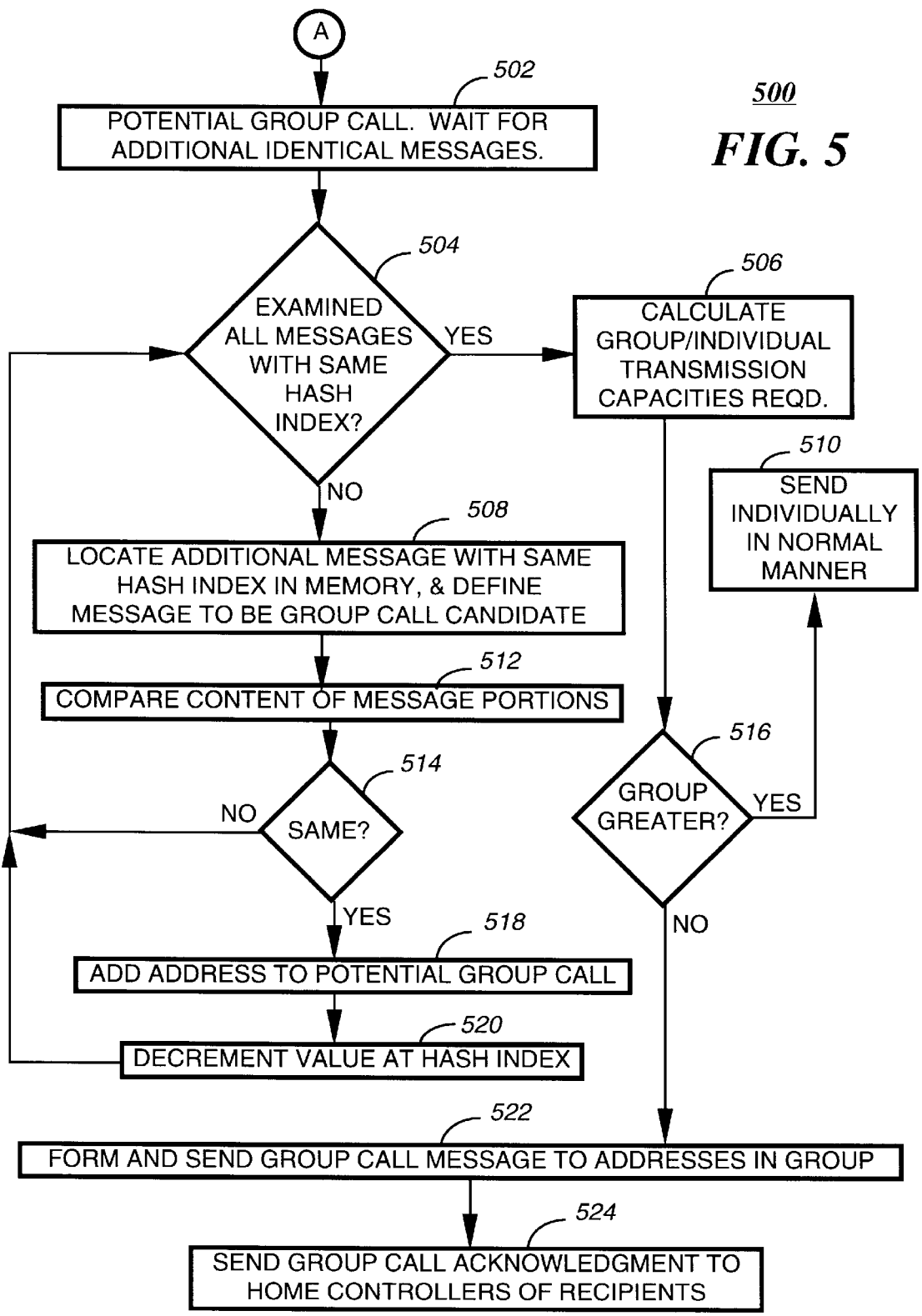

Referring to FIG. 5, the processing system 204 at step 502 has formed a potential group call message. To see if there are additional messages identical to the group call message, the processing system waits for a predetermined time, e.g., one minute. After the wait the processing system 204 checks 504 to determine whether all messages with the same hash index have been examined. This can be accomplished, for example, by keeping a count of the messages examined, and comparing the count with the sum of the value stored at the hash index and the number of messages grouped for the potential group call. If the count and the sum are the same, then all messages with the hash index have been examined. If all messages with the same hash index have been examined, then the processing system 204 preferably calculates 506 the transmission capacities, e.g., number of code words, required to transmit the messages both individually and as a group call message. If transmitting the messages as a group call message (including call set-up) requires more transmission capacity, then the processing system 204 transmits 510 the messages individually in a normal manner. If, on the other hand, transmitting the messages as a group call message requires the same or less transmission capacity, then the processing system forms and sends 522 a group call message to the addresses in the group. The processing system then sends 524 a group call acknowledgment to the home controllers of the message recipients.

If, on the other hand, at step 504 all the messages with the same hash index have not been examined, then the processing system 204 searches the memory 210 to locate 508 an additional message with the same hash index and then defines the additional message to be a group call candidate. The processing system then compares 512 the content of predetermined portions of the additional message with those of the potential group call message. If the predetermined portions are not the same, the flow returns to step 504. On the other hand, if the predetermined portions are the same, the processing system adds 518 the address of the message to the potential group call and decrements 520 the value at the hash index. Flow then returns to step 504 to determine whether all messages with the same hash index have been examined.

Thus it should be apparent by now that the present invention provides a method and apparatus that advantageously allows the implementation of dynamic group call messages in a messaging system. The method and apparatus performs automatically to detect messages that can be combined, and then combines such messages by transmitting them as a dynamic group call message when doing so will save airtime. The implementation of dynamic group call advantageously allows the messaging system service provider to increase the number of subscribers on the messaging system, thereby increasing the revenues derived from the messaging system.

While the foregoing has disclosed by way of example one embodiment in accordance with the present invention, it will be appreciated that many alternative embodiments in accordance with the present invention may occur to one of ordinary skill in the art, given the teachings of this disclosure. For example, means other than hashing by the division method, e.g., hashing by the "multiplication method" or by the "universal method," can be utilized to select candidates for group call messages. At the cost of substantially greater processing, the selection of group call candidates by hashing or other methods can even be eliminated by comparing the content of predetermined portions of each message received with corresponding portions of all messages in queue in order to find messages suitable for sending as group call messages. In addition, the electrical block diagram of FIG. 2 and the flow charts of FIGS. 3–5 (except for step 524) all apply to the home controller 120 when the present invention is used in the home controller 120. These and other variations fall within the scope and intent of the present invention. Accordingly, the scope of the invention is delimited only in accordance with the following claims.

What is claimed is:

1. A method in a messaging system for implementing a group call, the method comprising in a controller the steps of:

receiving first and second messages intended for first and second recipients;

determining that the first and second messages are identical to one another; and transmitting the first and second messages as a single group call message, in response to the determining step.

2. The method of claim 1, further comprising before the transmitting step the steps of:

waiting for a predetermined time after the determining step to detect whether additional messages identical to the first and second messages are received; and combining such additional messages into the single group call message.

3. The method of claim 1, wherein the transmitting step comprises the step of forming the single group call message in accordance with a messaging protocol which includes a dynamic group address mode capability.

4. The method of claim 1, further comprising in the controller the steps of:

receiving an interswitch command for triggering a dynamic group call; and sending the dynamic group call in response to the interswitch command.

5. The method of claim 1, further comprising the steps of providing selection controls for allowing an operator of the messaging system to specify criteria to be met before a message is considered for transmission as a group call message; and skipping the transmitting step in response to at least one of the first and second messages failing to meet the criteria specified.

6. The method of claim 1, further comprising in the controller the step of sending an acknowledgment to another controller in the messaging system, the acknowledgment indicating that at least one of the first and second messages was transmitted in a single group call message, in response to the transmitting step.

7. The method of claim 1, further comprising in the controller the steps of calculating, in response to the determining step, a first transmission capacity required to transmit the first and second messages as individual messages and a second transmission capacity required to transmit the first and second messages as the single group call message; and skipping the step of transmitting the first and second messages as a single group call message, and instead transmitting the first and second messages as individual messages, in response to the second transmission capacity being greater than the first transmission capacity.

8. The method of claim 1, wherein the determining step comprises the steps of:

calculating first and second hash indexes from attributes of the first and second messages;

comparing the first and second hash indexes; and defining the first and second messages to be group call candidates in response to the first and second hash indexes being equal to one another.

9. The method of claim 8, wherein the determining step further comprises the step of comparing predetermined portions of the first and second messages, in response to the first and second messages being defined to be group call candidates.

10. The method of claim 8, wherein the determining step further comprises the step of storing in a memory of the controller at a location defined by a hash index a count of pending messages corresponding to the hash index.

11. The method of claim 8, wherein the determining step further comprises the step of storing in a memory of the controller a pending message and a corresponding hash index.

12. A controller in a messaging system for implementing a group call, the controller comprising:

a communication interface for receiving first and second messages intended for first and second recipients;

a processing system coupled to the communication interface for determining that the first and second messages are identical to one another; and a transmitter interface for transmitting the first and second messages as a single group call message, in response to determining that the first and second messages are identical to one another.

13. The controller of claim 12, wherein the processing system is programmed to:

wait for a predetermined time after determining that the first and second messages are identical to one another to detect whether additional messages identical to the first and second messages are received; and combine such additional messages into the single group call message.

14. The controller of claim 12, wherein the processing system is programmed to form the single group call message in accordance with a messaging protocol which includes a dynamic group address mode capability.

15. The controller of claim 12, wherein the processing system is programmed to:

provide selection controls for allowing an operator of the messaging system to specify criteria to be met before a message is considered for transmission as a group call message; and skip transmitting the first and second messages as a single group call message, in response to at least one of the first and second messages failing to meet the criteria specified.

16. The controller of claim 12, wherein the processing system is programmed to send an acknowledgment to another controller in the messaging system, the acknowledgment indicating that at least one of the first and second messages was transmitted in a single group call message, in response to transmitting the first and second messages as a single group call message.

17. The controller of claim 12, wherein the processing system is programmed to:

calculate, in response to determining that the first and second messages are identical to one another, a first transmission capacity required to transmit the first and second messages as individual messages and a second transmission capacity required to transmit the first and second messages as the single group call message; and skip transmitting the first and second messages as a single group call message, and instead transmit the first and second messages as individual messages, in response to the second transmission capacity being greater than the first transmission capacity.

18. The controller of claim 12, wherein the processing system is programmed to:

calculate first and second hash indexes from attributes of the first and second messages;

compare the first and second hash indexes; and define the first and second messages to be group call candidates in response to the first and second hash indexes being equal to one another.

19. The controller of claim 18, wherein the processing system is further programmed to compare predetermined portions of the first and second messages, in response to the first and second messages being defined to be group call candidates.

20. The controller of claim 18, wherein the processing system is further programmed to store in a memory of the controller at a location defined by a hash index a count of pending messages corresponding to the hash index.

21. The controller of claim 18, wherein the processing system is further programmed to store in a memory of the controller a pending message and a corresponding hash index.

* * * * *